United States Patent
Weinberg et al.

(10) Patent No.: US 10,503,453 B2
(45) Date of Patent: Dec. 10, 2019

(54) INTERACTING WITH DIGITAL CONTENT USING MULTIPLE APPLICATIONS

(71) Applicant: Dropbox, Inc., San Francisco, CA (US)

(72) Inventors: Daniel Weinberg, Berkeley, CA (US); Anthony Grue, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 31 days.

(21) Appl. No.: 14/580,189

(22) Filed: Dec. 22, 2014

(65) Prior Publication Data

US 2016/0125842 A1 May 5, 2016

Related U.S. Application Data

(60) Provisional application No. 62/072,709, filed on Oct. 30, 2014.

(51) Int. Cl.
*G06F 9/451* (2018.01)
*G06F 3/14* (2006.01)

(52) U.S. Cl.
CPC ........... *G06F 3/14* (2013.01); *G09G 2340/12* (2013.01)

(58) Field of Classification Search
None
See application file for complete search history.

(56) References Cited

U.S. PATENT DOCUMENTS

| | | | | |
|---|---|---|---|---|
| 5,673,401 A * | 9/1997 | Volk | ..... | G06F 3/04847 348/E5.103 |
| 2001/0043279 A1* | 11/2001 | Niikawa | ..... | H04N 5/232 348/335 |
| 2009/0254855 A1* | 10/2009 | Kretz | ..... | G06F 1/1626 715/800 |
| 2011/0225549 A1* | 9/2011 | Kim | ..... | G06F 3/04883 715/838 |
| 2012/0198386 A1* | 8/2012 | Hautala | ..... | G06F 3/0481 715/838 |
| 2013/0016113 A1* | 1/2013 | Adhikari | ..... | G06T 11/60 345/589 |
| 2013/0318476 A1* | 11/2013 | Sauve | ..... | G06F 9/4443 715/835 |
| 2014/0344750 A1* | 11/2014 | Takahashi | ..... | G06F 3/14 715/790 |

(Continued)

*Primary Examiner* — Xiao M Wu
*Assistant Examiner* — Steven Z Elbinger
(74) *Attorney, Agent, or Firm* — Keller Jolley Preece

(57) ABSTRACT

One or more embodiments facilitate a user experience in which a user can conveniently switch between different applications on a mobile device for capturing and interacting with digital content. For example, a content navigation system can identify an application installed on a mobile device having content capturing functionality. In addition, the content navigation system can detect that a graphical user interface associated with the identified content capturing application is displayed via a touch screen on the mobile device. Further, based on detecting that the graphical user interface associated with the content capturing application is displayed, the content navigation system can overlay a graphical element associated with a content management application over the graphical user interface. The graphical element can facilitate convenient switching between different applications on the mobile device.

20 Claims, 10 Drawing Sheets

(56) References Cited

U.S. PATENT DOCUMENTS

2015/0039616 A1* 2/2015 Rolston ............... G06F 17/3028
707/737
2015/0062097 A1* 3/2015 Chung .................. G06F 1/1626
345/184

* cited by examiner

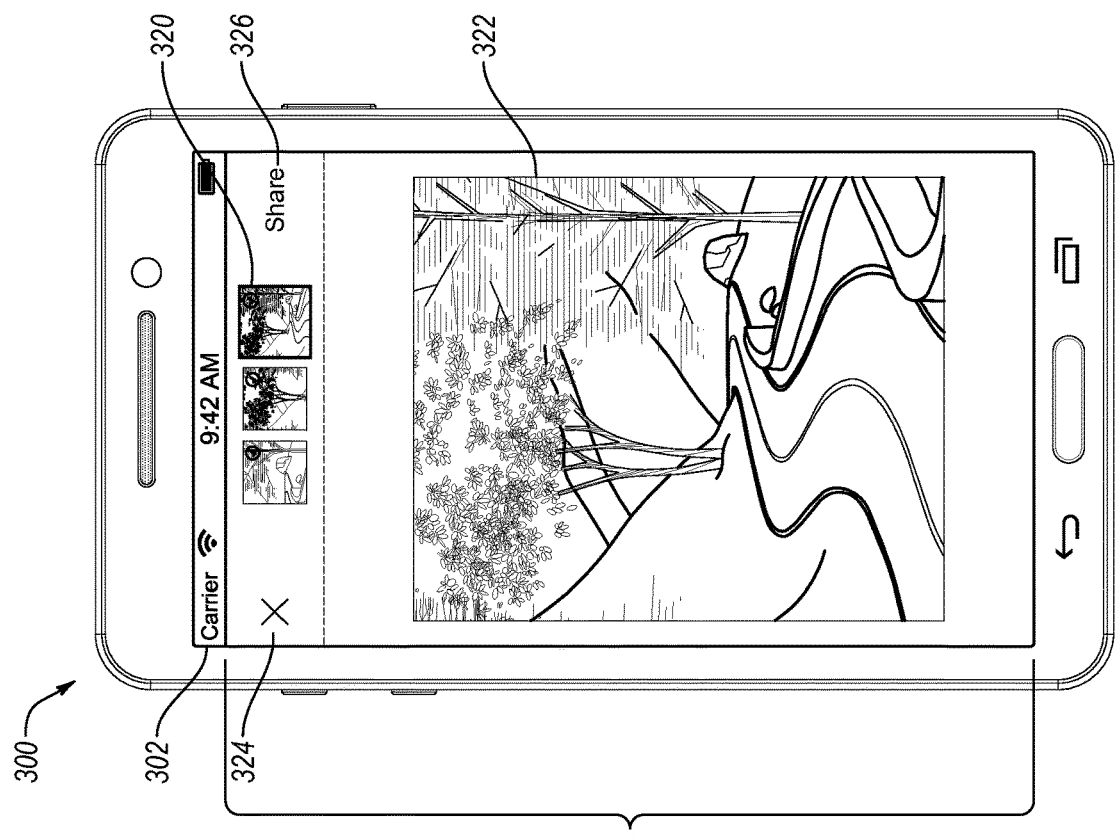
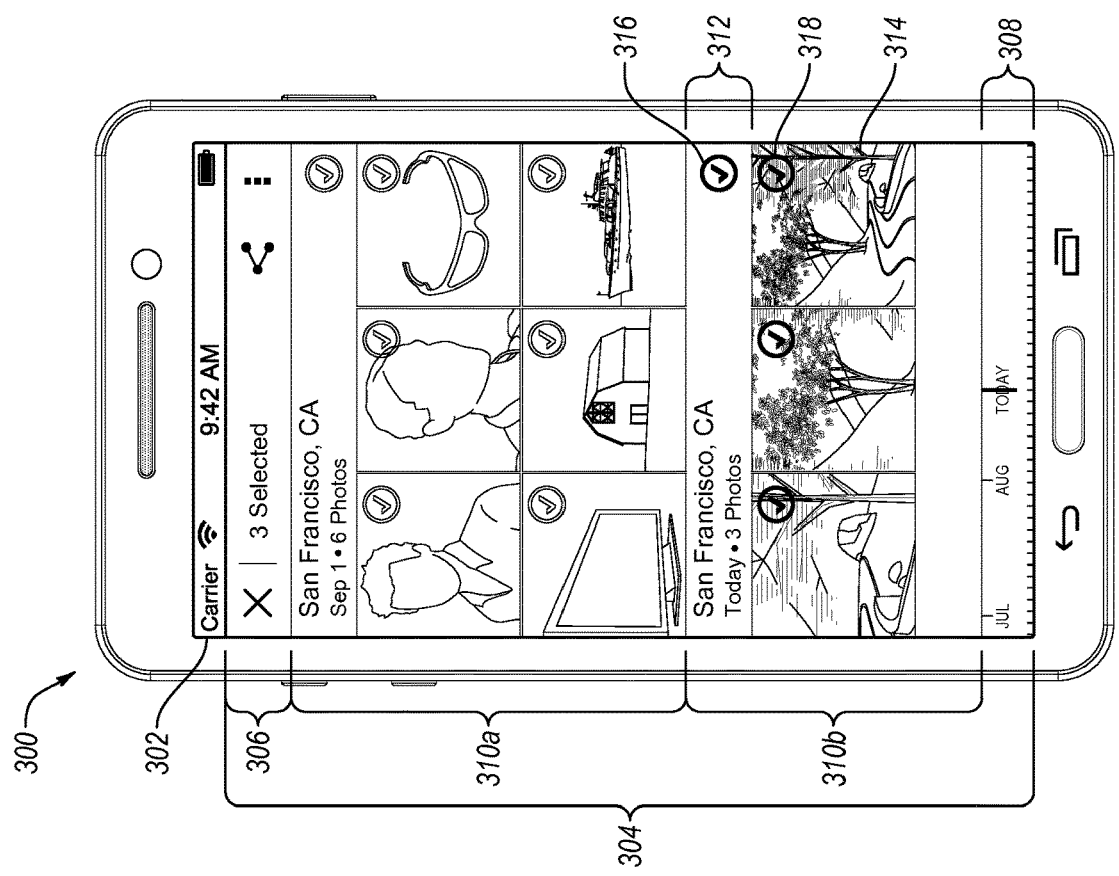
Fig. 3B
Fig. 3A

INTERACTING WITH DIGITAL CONTENT USING MULTIPLE APPLICATIONS

CROSS REFERENCE TO RELATED APPLICATIONS

This application claims priority to and the benefit of U.S. Provisional Application No. 62/072,709, filed Oct. 30, 2014, entitled "Interacting with Digital Content Using Multiple Applications," the entirety of which is incorporated herein by reference.

BACKGROUND

1. Technical Field

One or more embodiments of the present disclosure relate generally to systems and methods for managing digital content. More specifically, one or more embodiments of the present disclosure relate to systems and methods of providing a graphical user interface that allows a user to capture and interact with digital content.

2. Background and Relevant Art

Computing devices (e.g., computers, tablets, smart phones) provide numerous ways for people to capture, create, share, view, and otherwise interact with numerous types of digital content. For example, computing devices allow users to interact with digital photos by capturing, sharing, and viewing digital photos. To facilitate user interaction with digital content, conventional systems may provide user interfaces that present digital content to a user in a variety of presentation styles and formats. Regardless of presentation style and format, however, conventional systems have several disadvantages and drawbacks.

For example, many conventional computing devices include various applications that provide different functionality with regard to digital content. For example, many conventional devices have a camera application for capturing photos (e.g., a camera application), while also having one or more separate applications for interacting with the captured photos. For instance, sharing, editing, viewing, and otherwise experiencing photos often involves frequent switching between multiple different applications to perform a particular function with respect to the captured photos. Therefore, due to the nature of conventional systems, interacting with the photos often requires frequent switching between applications. Constantly having to switch between different applications to interact with photos can be inefficient, complicated, and thus is frustrating to a user.

In particular, many conventional computing devices include an application for capturing photos and a separate application for managing the captured photos. For example, many computing devices include a camera application that captures and stores photos on the computing device, and a photo application that allows the user to view the captured photo. Often, users like to view photos right after capturing a photo (e.g., to make sure the photo is satisfactory), and then continue to take additional photos with the camera. In many conventional systems, however, the process of switching between the camera application and the viewing application is tedious, thus diminishing the user experience of capturing photos and experiencing the captured photos.

In an attempt to avoid switching between a camera application and a viewing application, often users capture several photos using the camera application with the purpose of capturing the best photo possible. For example, a user may capture five photos of the same scene with the intent of reviewing all five photos, only keeping the best photo, and deleting the lesser photos. In many conventional systems, however, due to the content viewing application being separate from the camera application, there is no intuitive process for the user to review the captured photos, and therefore, the user often fails to review and delete the lesser liked photos. Thus, over time, redundant or duplicative photos can needlessly consume a substantial portion of the storage of a computing device.

Moreover, upon a user accessing an application to view recently captured photos, many conventional systems do not account for a user's interest in the recently captured photos. For instance, upon accessing an application to view recently captured photos, the application may provide a first photo in a collection of photos that is not part of the recently collected photos. Thus, a user must search through the collection of photos to locate the recently captured photos. Additionally, a user may have captured several photos that the user now wants to review. Conventional systems, however, fail to recognize the group of recently captured photos, thus forcing a user to manually navigate within a larger collection of photos to locate each of the recently captured photos.

Accordingly, there are a number of considerations to be made in presenting digital content.

SUMMARY

Embodiments of the present disclosure provide benefits and/or solve one or more of the foregoing or other problems in the art by providing systems and methods for a user to capture and interact with digital content. In accordance with one or more embodiments, the present disclosure includes systems and methods for facilitating a user experience in which a user can intuitively and efficiently switch between a content capturing application and a content management application. For example, according to principles described herein, the systems and methods identify an application installed on a mobile device that has a content capturing functionality (e.g., a content capturing application). In one or more embodiments, the systems and methods can detect that a graphical user interface associated with the content capturing application is currently displayed on a touch screen of the mobile device. Further, based on detecting that the graphical user interface is displayed, the systems and methods include overlaying a graphical element associated with a content management application over the graphical user interface.

Additionally, one or more embodiments provide systems and methods that allow a user to seamlessly and efficiently experience digital content with different applications on a mobile device. In particular, one or more embodiments include detecting when a content capturing application is active, and in response, providing an interactive graphical element overlay that corresponds to a content managing application. The user can then directly access a content managing application from directly within the content capturing application by selecting or otherwise interacting with the graphical element. As such, a user can easily switch from a content capturing application to a content management application, thus increasing the quality of a user's experience.

Further, one or more embodiments can provide systems and methods that facilitate effective management of digital content items upon capturing the digital content items with a content capturing application by allowing a user to easily discard redundant or unwanted digital content. For example, one or more embodiments include systems and methods that allow a user to capture digital content with a content capturing application, and then directly access a content management application to review the captured content. In addition, upon accessing the content management application, the systems and methods can present the recently captured content to the user in a way to allow the user to easily review the recently captured content, and then determine which of the recently captured content items to discard. As such, a user can conveniently discard unwanted digital content, thus reducing storage consumption from unwanted or redundant digital content.

In addition, one or more embodiments provide systems and methods identify captured digital content during a particular time period, and then present the captured digital content for the particular time period to the user for review. For instance, in one or more embodiments, a user can capture digital content using a content capturing application, and then directly access a content management application by interacting with a graphical element provided within the content capturing application. Upon accessing the content management application, the content management application can have the captured digital content preselected, thus allowing the user to view captured digital content with minimal user input, thereby increasing the ease and efficiency of capturing, viewing, and managing digital content using a mobile device.

Additional features and advantages of the present disclosure will be set forth in the description that follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above-recited and other advantages and features of the disclosure can be obtained, a more particular description of the disclosure briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments of the present disclosure and are not therefore to be considered to be limiting of its scope, the present disclosure will be described and explained with additional specificity and detail through the use of the accompanying drawings.

FIGS. 3A-3D illustrate example user interfaces for managing digital content in accordance with one or more principles described herein;

DETAILED DESCRIPTION

Figure 1:
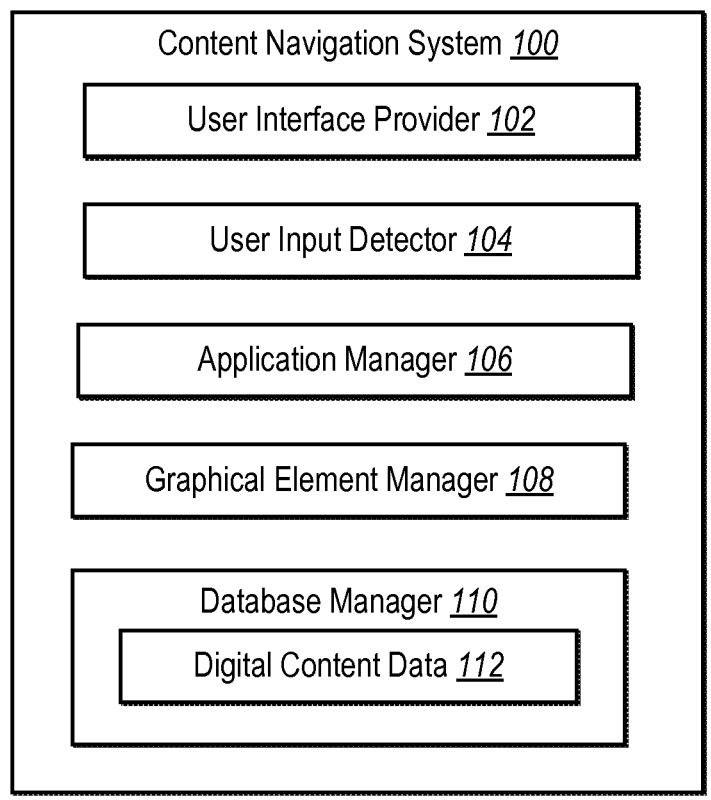
FIG. 1 illustrates a schematic diagram of a system for navigating digital content in accordance with principles described herein.

The present disclosure provides one or more embodiments of a content navigation system that improves a user experience related to a user capturing and interacting with digital content items (e.g., digital photos). In particular, the principles disclosed herein allow a user to efficiently, intuitively, and enjoyably capture, manage, experience, and otherwise interact with digital content items using a mobile device. In one or more example embodiments, a content navigation system can identify an application installed on the computing device that has a content capturing functionality (e.g., a camera application). Further, the content navigation system can monitor for, and detect, the display of a graphical user interface associated with a content capturing application on a display (e.g., touch screen) of a computing device. In response to detecting the display of the graphical user interface associated with the content capturing application, the content navigation system can overlay a graphical element associated with a content management application over the graphical user interface. A user can interact with the overlaid graphical element to easily access the content management application to view, delete, or otherwise manage the captured content.

Additionally, one or more embodiments of a content navigation system can provide functionality for conveniently interacting with digital content items across different applications on the computing device. In particular, the content navigation system can include one or more features to facilitate switching between applications on the computing device for capturing, managing, and otherwise interacting with digital content items. For example, a content navigation system can detect that a graphical user interface associated with the camera application is displayed via a touch screen of the mobile device. Further, in response to detecting that the graphical user interface is displayed, the content navigation system can overlay a graphical element associated with a content management application over the graphical user interface of the camera application. In some embodiments, the content navigation system can detect a user interaction (e.g., user selection) with the graphical element, and in response, switch directly from the camera application to the content management application. As such, a user can easily change between the camera application and the content management application to provide an efficient and intuitive user experience for capturing and managing digital content on a computing device.

Additionally, one or more embodiments of the content navigation system can facilitate effective management of digital content items. In particular, a content navigation system can include one or more features to facilitate managing recently captured digital content. For example, a mobile device can capture photos via a camera application. In particular, a user may capture multiple photos using a camera functionality of the computing device in hopes of capturing at least one high quality photo. Upon capturing the multiple photos, the content navigation system may enable a user to directly access the multiple captured photos in a content management application, and thereafter, select the best photo(s) and/or discard the unwanted photos.

Additionally, one or more embodiments of a content navigation system can identify a group of digital content items that the user captured during a particular time period, and provide direct access to the group of digital content items from directly within a content capturing application. For example, a content navigation system can provide a graphical element within a camera application that a user accesses to capture a group of photos. The user can then interact with the graphical element, and in response, the content navigation system can provide the group of photos within a content management application with the group of photos already selected. Therefore, with the group of photos already selected, the user can quickly and easily view the selected photos without having to navigate through other photos that were not captured during the particular time period. Additional features, characteristics, advantages, processes, and methods will be explained further below with reference to the figures.

As used herein, "digital content" refers to any digital data. The terms "digital content item," "content item," and "digital item" can include a data file. Examples of digital content items include, but are not limited to, digital photos, digital video files, digital audio files, document files of all types, streaming content, contact lists, and/or folders that include one or more digital content items. The term "digital content item," "content item," and "digital item" may refer interchangeably to the digital content items themselves and to representations of digital content items (e.g., thumbnail images representing the digital content items). In addition, a "collection" or "gallery" of digital content items can include a single type of content item or multiple different types of content items. In addition, a collection of digital content items can include as few as one content item, but in many instances, a collection of digital content items can include large numbers of content items. Although various example embodiments discussed below relate to photos, one will appreciate that the principles described herein may be applied to other types of digital content items.

Additionally, a "content management" application can refer to an application having functionality related to managing one or more digital content items. Generally, for example, a content management application can organize digital content to allow a user to interact or otherwise experience digital content. For instance, a content management application can organize and/or present digital content items to allow a user to view, edit, delete, share, send, navigate and/or otherwise manage digital content items within a collection of digital content. In one or more embodiments, a content management application can be part of, or communicate with, an online content management system.

Moreover, a "content capturing" application can refer to an application that has the functionality of capturing digital content using one or more hardware features of a computing device on which the content capturing application is installed. Examples of content capturing applications include digital camera applications, audio recording applications, video camera applications, and/or any other type of application capable of capturing digital content. Although various example embodiments of a content navigation system are discussed below with respect to a camera application, one will appreciate that the principles discussed with respect to a camera application can also be applied to other types of content capturing applications.

FIG. 1 illustrates an example embodiment of a content navigation system 100 (or simply "system 100") in accordance with one or more principles described herein. As shown, system 100 may include, but is not limited to, user interface provider 102, user input detector 104, application manager 106, graphical element manager 108, and database manager 110. Each of components 102-110 of system 100 may be in communication with one another using any suitable communication technologies. It will be recognized that although components 102-110 are shown to be separate in FIG. 1, any of components 102-110 may be combined into fewer components, such as into a single component, or divided into more components as may serve a particular embodiment.

In addition, components 102-110 may be located on, or implemented by, one or more computing devices, for example, a handheld device, mobile device, tablet, laptop computer, or desktop computer, or other computing devices as described below in relation to FIG. 7. In addition, one or more portions of system 100 (e.g., database manager 110) can be located on one or more server devices that form online content management system, such as an online content management system described below in reference to FIG. 8.

Each of components 102-110 can comprise software, hardware, or both. For example each of components 102-110 can comprise one or more instructions stored on a computer-readable storage medium and one or more processors of one or more computing devices to execute instructions. When executed by the one or more processors, the computer-executable instructions cause a computing device to perform the methods described herein. Alternatively, components 102-110 can comprise hardware, such as a special-purpose processing device to perform certain functions or group of functions.

As mentioned above, and as shown in FIG. 1, system 100 can include user interface provider 102. User interface provider 102 can provide a graphical user interface that allows a user to capture, navigate, browse, view, share, manage, and/or otherwise experience digital content using system 100. For example, user interface provider 102 can provide a graphical user interface associated with a content capturing application that facilitates capturing digital content using a computing device. Likewise, user interface provider 102 can provide a graphical user interface associated with a content management application that facilitates managing or otherwise interacting with captured digital content items.

In one or more embodiments, for example, user interface provider 102 can present various graphical elements via a display device of a computing device (e.g., touch screen, monitor, or other display device). For example, user interface provider 102 can cause a computing device to present one or more graphical objects that represent digital content. For instance, in one or more embodiments, user interface provider 102 can present reduced-size versions of digital content, such as thumbnails or icons of digital photos. In some embodiments, user interface provider 102 can present reduced-size versions of digital content in a grid format within a graphical user interface, as described below in relation to FIGS. 3-4. Alternatively, user interface provider 102 may facilitate presentation of other types of digital content (e.g., audio, videos, webpages, documents), depending on the particular application of system 100.

In addition, user interface provider 102 can cause a computing device to present one or more interactive elements that enable capturing, browsing, navigating, and interacting with digital content items within a graphical user interface. In particular, user interface provider 102 can cause a computing device to provide one or more interactive elements that correspond to a content capturing application to enable the capture of digital content items. Similarly, user interface provider 102 can provide one or more interactive elements that correspond to a content management application to enable the management of captured digital content items. In addition, in one or more embodiments, user interface provider 102 can cause the computing device to provide one or more graphical elements that facilitates switching between different applications on a computing device.

In addition to providing features that enhance interacting with digital content using different applications, user interface provider 102 can further provide a graphical user interface including one or more graphical objects related to an activation function within the graphical user interface. In particular, user interface provider 102 can provide within a graphical user interface (e.g., associated with an application) one or more objects or function symbols that can activate a function on the computing device. As used herein, a "function" can include any action performed by a computing device. For example, a function can include executing software, activating hardware, accessing content, or a combination thereof. For instance, user interface provider 102 can provide a camera element within a graphical user interface of a camera application that indicates to a user that providing one or more interactions with the camera element will activate a camera on the mobile device. Therefore, a user can interact with various graphical objects within a graphical user interface to activate various functions.

As further illustrated in FIG. 1, system 100 can include user input detector 104. In one or more embodiments, user input detector 104 can detect, identify, and/or receive, a user interaction and translate a user interaction into a user input (e.g., a user command or request). As referred to herein, a "user interaction" means a single interaction, or combination of interactions, received from a user by way of one or more input devices. In some embodiments, user input detector 104 can translate a combination of user interactions as a single user input and/or translate a single user interaction into multiple user inputs.

For example, user input detector 104 can detect a user interaction from a keyboard, mouse, touch screen, or any other input device. In the event a user input device is a touch screen, user input detector 104 can detect one or more touch gestures (e.g., swipe gestures, tap gestures, pinch gestures, or reverse pinch gestures) that a user provides to the touch screen. In one or more embodiments, the user can provide one or more touch gestures in relation to and/or directed at one or more graphical objects, items, or elements of a graphical user interface on a touch screen. User input detector 104 may additionally, or alternatively, receive data representative of a user interaction. For example, user input detector 104 can receive one or more user configurable parameters from a user, one or more user commands from the user, and/or any other suitable user input.

System 100 can use user input and/or data received from user input detector 104 to manage, control and/or facilitate the use of a graphical user interface. In general, in response to user input detector 104 detecting one or more user interactions, system 100 can allow a user to use a computing device to capture, view, search, edit, share, and/or otherwise experience digital content. For example, in response to user input detector 104 detecting one or more touch gestures, system 100 can allow a user to capture digital content using a content capturing application. In addition, upon detecting one or more touch gestures with respect to a graphical element, the system 100 can switch from a content capturing application to a content management application, thus allowing a user to interact with captured content.

FIG. 1 further illustrates that system 100 can include application manager 106. In one or more embodiments, application manager 106 can identify various applications installed on a computing device having various functionalities. In particular, application manager 106 can identify an application installed on a computing device that has a predefined functionality. For example, application manager 106 can identify one or more applications installed on a computing device that have content capturing functionality. For instance, application manager 106 can identify one or more applications having photo capturing, video capturing, and/or audio capturing functionality. In some embodiments, application manager 106 can identify any application having access to a camera on a computing device. In one or more embodiments, the application manager 106 can identify a list of applications that have access to a camera function on a computing device.

Generally speaking, application manager 106 can identify the various functions and characteristics of applications installed on a computing device by identifying one or more access permissions associated with a particular application. For example, a camera application can include one or more permissions that indicate the camera application has permission to access a camera function of a computing device. Thus, upon identifying an access permission associated with a camera function, application manager 106 can identify the corresponding application as a content capturing application.

In some embodiments, application manager 106 can monitor the operation of different applications installed on a computing device. In particular, application manager 106 can monitor for an active application on a computing device, or in other words, an application operating in the foreground of an operating system. For example, an application operating in the foreground of an operating system of can refer to an application associated with a display of a graphical user interface on a display device of a computing device.

In addition to monitoring for an active application operating in the foreground, application manager 106 can monitor one or more applications operating in the background of an operating system on the computing device. In some embodiments, an application operating in the background of the operating system can refer to any application operating on a computing device that is not operating in the foreground. As an example, a background application can refer to any application operating on a computing device while the display device presents a graphical user interface not associated with the background application (e.g., a graphical user interface for the foreground application). For example, a content management application operating in the background can detect captured content (e.g., from a camera application operating in the foreground), save captured content, organize captured content, or otherwise manage digital content items while the content management application is operating in the background.

In one or more embodiments, application manager 106 can monitor the foreground status to determine whether a content capturing application is active. For example, in one or more embodiments, application manager 106 can monitor, at the operating system level, an indication of which application is currently operating in the foreground. For instance, an operating system can include a system indicator that indicates the status of the foreground, such as which application, if any, is currently operating in the foreground on the computing device.

In addition to monitoring the foreground status, in one or more embodiments, application manager 106 can detect that a graphical user interface associated with a particular application is displayed via a display (e.g., touchscreen) of a computing device. For example, as mentioned above, application manager 106 can identify a camera application (or any application having content capturing functionality). Additionally, application manager 106 can detect that a graphical user interface associated with the camera application is displayed via a touchscreen of the mobile device. For example, application manager 106 can detect that a camera application is running in the foreground of an operating system on the mobile device.

Application manager 106 can detect that a graphical user interface associated with a particular application is displayed on a display of the mobile device in a variety of ways. For example, application manager 106 can detect that the graphical user interface associated with the application is displayed by identifying that the associated application is operating in the foreground of the operation system. For instance, application manager 106 can communicate with user interface provider 102 and receive an indication that a graphical user interface associated with an identified application is displayed on the display device of the computing device. Additionally or alternatively, application manager 106 can analyze a display of a computing device periodically (e.g., one or more times per second) and determine that the graphical user interface displayed on the display device of the computing device corresponds to the identified application.

Additionally or alternatively, in one or more embodiments, application manager 106 can detect that a graphical user interface associated with a particular application is displayed by detecting one or more functions performed by the computing device in connection with the identified application. For example, application manager 106 can detect that a graphical user interface associated with a camera application is displayed on the display device by detecting usage of a camera function on the computing device. Thus, in response to detecting the usage of the camera function, application manager 106 can determine that the camera application is currently active on the computing device.

FIG. 1 further illustrates that system 100 can include graphical element manager 108. In one or more embodiments graphical element manager 108 can provide a graphical element that corresponds with a particular application on the computing device. For example, graphical element manager 108 can provide a graphical element to user interface provider 102 to present the graphical element to a user in certain circumstances, and thus allow a user to access the particular application on the computing device by interacting with the graphical element, as will be explained further below. In one or more embodiments, graphical element manager 108 can communicate with the user interface provider 102 and provide an overlay of a graphical element over a graphical user interface associated with another application.

In some embodiments, graphical element manager 108 can provide a graphical element in response to detecting that the graphical user interface associated with an identified application is displayed on a display device of a computing device. For example, based on detecting that a graphical user interface associated with a content capturing application is displayed, graphical element manager 108 can overlay the graphical element over the graphical user interface of the camera application. In particular, application manager 106 can monitor foreground activity of an operating system to indicate that a content capturing application is active on a display device. Upon detecting the content capturing application is active on the display device, application manager 106 can notify graphical element manager 108. In response to receiving the notification, graphical element manager 108 can communicate with user interface provider 102 to cause the computing device to present the graphical element as an overlay over the graphical user interface of the camera application.

In some embodiments, graphical element manager 108 can provide the graphical element over lay immediately upon detecting the active display of the graphical user interface associated with the camera application. Alternatively, graphical element manager 108 can consider one or more additional factors to determine when to provide the graphical element overlay. For example, where the graphical user interface is associated with a camera application and the graphical element is associated with a content management application, graphical element manager 108 overlay the graphical element over the graphical user interface of the camera application based on usage of the camera functionality of the computing device. In some embodiments, for example, graphical element manager 108 can overlay the graphical element over the graphical user interface only after detecting the camera application has captured at least one photo.

In addition to causing user interface provider 102 to present a graphical element overlay, graphical element manager 108 can also determine the location of the graphical element overlay with respect to an active graphical user interface. The placement or location of the graphical element can depend on various factors. For example, graphical element manager 108 can provide the graphical element at a particular location on a display of a computing device based on the type, brand, or model of the computing device. Additionally, graphical element manager 108 may consider an operating system platform of the computing device in determining placement of the graphical element.

Additionally, in some embodiments, graphical element manager 108 can provide the graphical element at a particular location of a graphical user interface based on the characteristics of the graphical user interface. For example, in one or more embodiments, graphical element manager 108 can analyze an active graphical user interface to determine a location of one or more graphical objects within the graphical user interface. Based on determining the locations of the one or more graphical objects, graphical element manager 108 can calculate or otherwise determine a location within the graphical user interface that least interferes with the active graphical user interface. Regardless of the particular technique for determining the location of a graphical element overlay, graphical element manager 108 can provide the graphical element at a particular location in order to limit disruption of a presentation of the graphical user interface or display of the computing device.

In some embodiments, graphical element manager 108 can provide a display of the graphical element in accordance with a user input. In particular, graphical element manager 108 can communicate with user input detector 104 and detect a user input for moving a location of the graphical element. As such a user can modify the location of the graphical element from a central position, default position, or other position of the graphical element within the display of the mobile device. For example, a user can move the graphical element using a swipe gesture or other touch gesture using a touchscreen of a mobile device.

In addition to interacting with the graphical element to move a location of the graphical element within the display of the mobile device, a user can interact with the graphical element to access an application associated with the graphical element. In particular, a user can select the graphical element (e.g., user input detector 104 detecting a user interaction with respect to the graphical element). Upon detecting a user selection with the graphical element, graphical element manager 108 can facilitate changing between the content capturing application and a content management application. For example, graphical element manager can cause the computing device to provide a display of a graphical user interface associated with the content management application in response to detecting a user selection of the graphical element. Additional details with regard to switching between applications and providing different graphical user interfaces are described below in connection with FIGS. 2-4.

Additionally, as shown in FIG. 1, system 100 can further include database manager 110. In some embodiments, database manager 110 may maintain digital content data 112 representative of digital content and associated information. For example, digital content data 112 can include digital content files, metadata associated with digital content, reduced-sized version of digital content (e.g., thumbnails), and/or other similar types of data that system 100 may use in connection with presenting digital content by way of a user interface.

As will be described in more detail below, each of components 102-110 of system 100 can be used alone and/or in combination to provide a user interface that allows a user to capture, navigate, and manage digital content in accordance with embodiments described herein. In particular, FIGS. 2-4 and the description that follows include various example embodiments of the principles of system 100 described above.

Figure 2A:
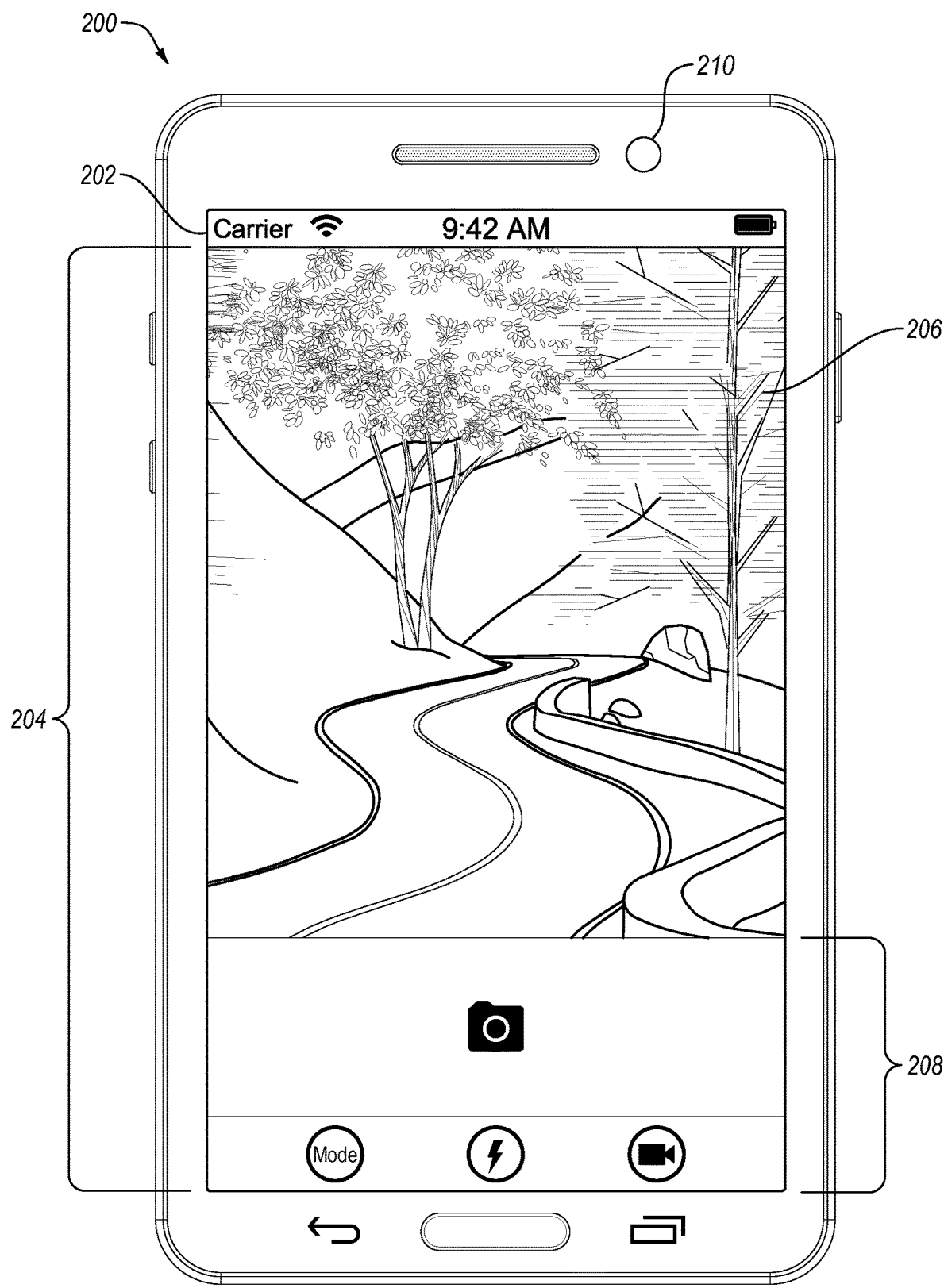
FIGS. 2A-2C illustrate example user interfaces for capturing digital content in accordance with one or more principles described herein.

FIG. 2A illustrates an example mobile device 200 including touchscreen 202 and graphical user interface 204. FIG. 2A also illustrates an example graphical user interface 204 associated with a content capturing application, or as shown in FIG. 2A, a camera application (or simply "camera interface 204"). For example, camera interface 204 provides a view finder display and various controls associated with a camera application. For example, as shown in FIG. 2A, camera interface 204 can include camera view 206 and camera controls 208 associated with camera 210 on mobile device 200. While FIG. 2A illustrates one embodiment of camera interface 204 associated with a camera application, it is appreciated that one or more embodiments may include different types of applications having other functionalities associated with mobile device 200.

As mentioned above, camera interface 204 can include camera view 206. As illustrated in FIG. 2A, camera view 206 can include a live representation of a view from camera 210 on mobile device 200. For example, camera view 206 can provide a real-time depiction of a view through a lens of camera 210 on mobile device 200.

In addition to camera view 206, camera interface 204 can further include one or more camera controls 208 associated with the camera application. In particular, camera controls 208 can include one or more graphical objects or elements that enable a user to activate the camera function of mobile device 200. For example, camera controls 208 can include a camera icon to initiate capturing digital content (e.g., photo, video) using camera 210 on mobile device 200. Additionally, camera controls 208 can include additional graphical objects that modify functionality of camera 210. For example, camera controls 208 can further include a mode icon, flash icon, video icon, or other selectable icon to modify usage of camera 210 in capturing digital content. In some embodiments, a user can activate or modify one or more functions of camera 210 via interactions with camera interface 204. Additionally or alternatively, a user can capture digital content using camera 210 or change various settings of camera 210 using physical buttons on mobile device 200.

Figure 2C:
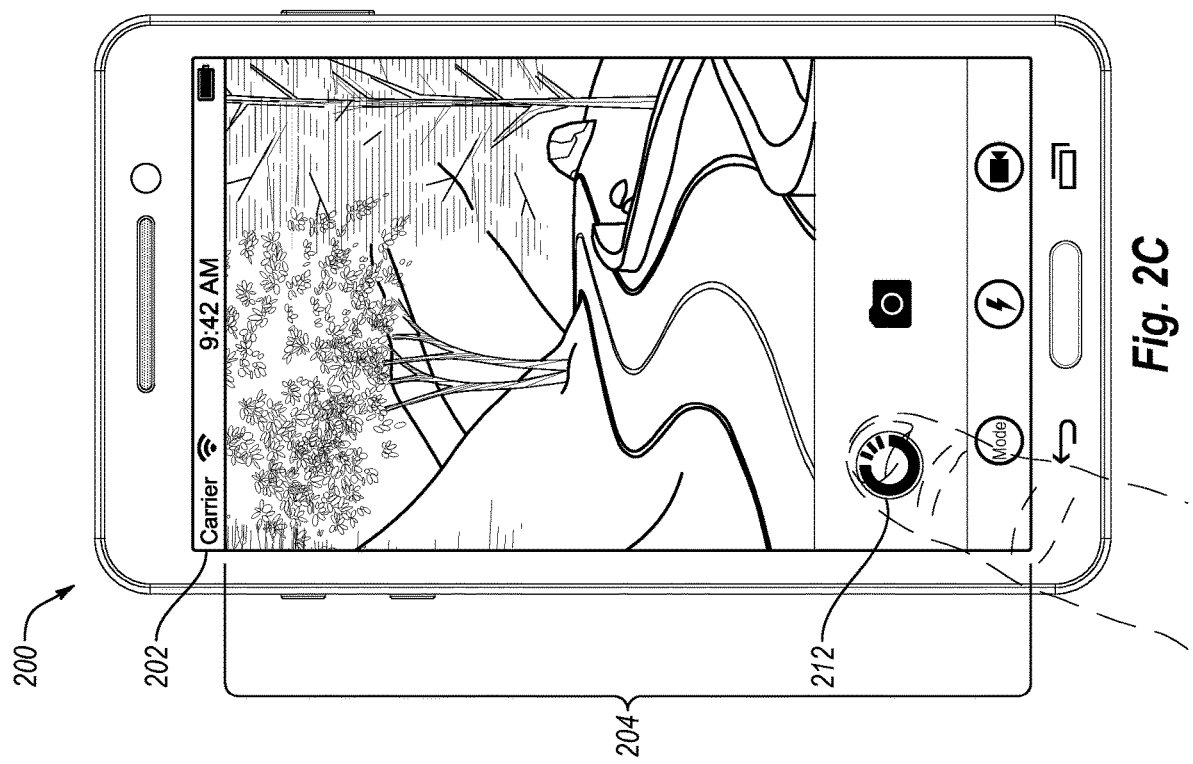
Figure 2B:
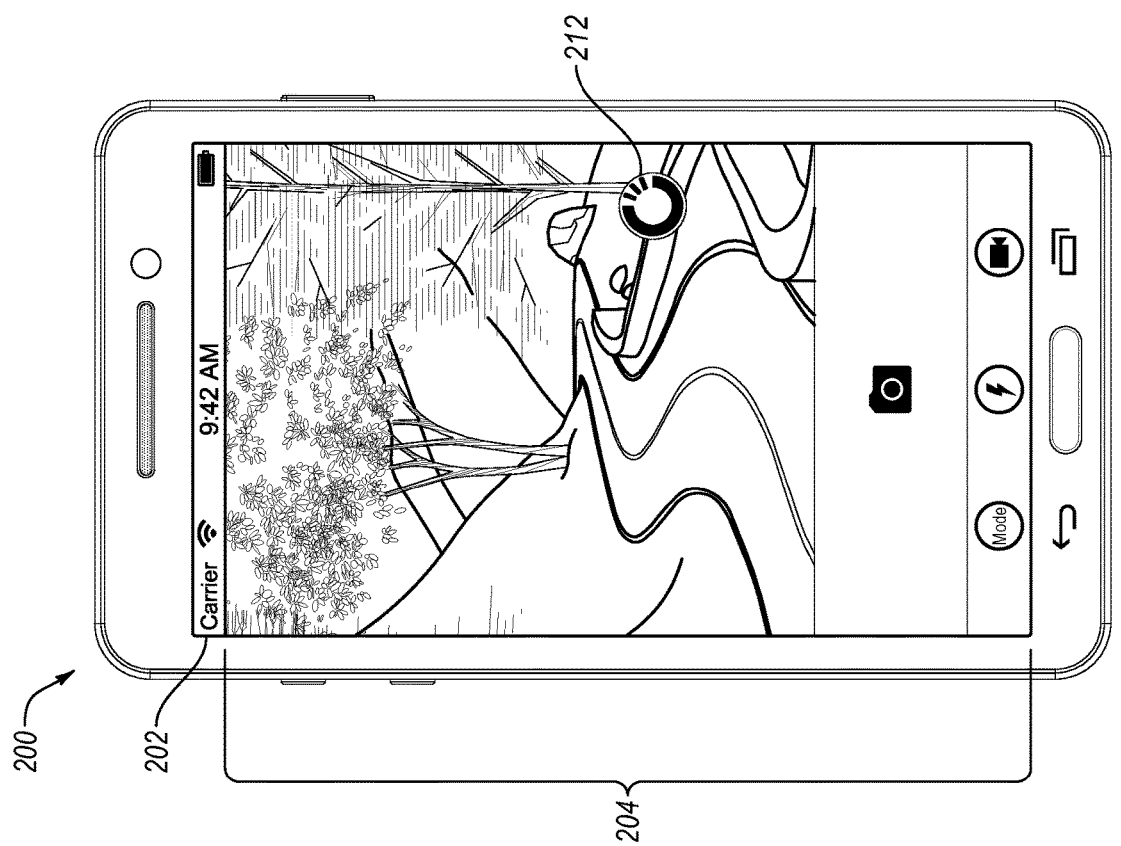

Similar to FIG. 2A, FIG. 2B shows an example camera interface 204 associated with a camera application. In addition, FIG. 2B illustrates graphical element 212 associated with a content management application overlaid camera interface 204. In particular, as illustrated in FIG. 2B, system 100 can detect that the camera application is active, and in response, system 100 can cause mobile device 200 to provide graphical element 212 displayed over camera interface 204. As illustrated in FIG. 2B, some embodiments of graphical element 212 can include a circular icon including a symbol or graphic associated with a content management application. Alternatively, graphical element 212 can include an icon having different shapes, sizes, or symbols.

System 100 can consider various factors in determining a size, appearance, and/or location of graphical element 212 within camera interface 204. For example, as illustrated in FIG. 2B, graphical element 212 can include a circular icon including a symbol associated with a content management application positioned toward a center-right portion of camera interface 204. In some embodiments, system 100 can determine a location for the display of graphical element 212 in order to limit disruption or avoid interfering with functionality of the camera application. For example, system 100 can select a location for graphical element 212 to avoid overlaying graphical element over one or more camera controls 208.

In displaying graphical element 212, system 100 can determine a location and provide a display of graphical element 212 at the determined location based on one or more physical characteristics of mobile device 200. In particular, system 100 can determine a location of graphical element 212 within camera interface 204 based on a type, brand, or model of mobile device 200. Additionally, system 100 can consider size and/or dimensions of touch screen 202 in determining size, location, and general appearance of graphical element 212 displayed over camera interface 204. Alternatively, in some embodiments, system 100 may display graphical element 212 at a location within camera interface 204 independent from one or more characteristics of mobile device 200.

In addition to considering characteristics of mobile device 200, system 100 can determine a location and provide a display of graphical element 212 at the determined location based on the camera application or other application(s) operating in the foreground of the operating system of mobile device 200. For example, where the camera application includes a display of one or more objects or function symbols, system 100 can avoid displaying graphical element 212 over camera interface 204 in a way that conflicts with or interferes with the objects or function symbols displayed via camera interface 204. In some embodiments, system 100 can determine a location for graphical element 212 individually for each application. Alternatively, system 100 can determine one or more locations within camera interface 204 that generally avoids conflict with objects or function symbols displayed in connection with different applications.

In addition to displaying graphical element 212 based on an application operating on mobile device 200, system 100 can consider the orientation of mobile device 200 in determining the location of graphical element 212 and providing the graphical element 212 at the determined location within camera interface 204. For example, where a graphical user interface changes with rotation of mobile device, graphical element 212 can also change with rotation of mobile device. Alternatively, in some embodiments, a location of graphical element 212 can be fixed and avoid rotating based on rotation of mobile device 200 and/or a changing orientation of camera interface 204.

FIG. 2C illustrates another example of camera interface 204 associated with the camera application. As illustrated in FIG. 2C, system 100 can provide a display of graphical element 212 over camera interface 204 based on a user interaction with graphical element 212. Additionally, as illustrated in FIG. 2C, a user can interact with graphical element 212 via touchscreen 202 of mobile device 200. For example, a user can interact with graphical element 212 using a swipe gesture, drag gesture, tap gesture, or other gesture that facilitates a user interaction with graphical element 212.

In some embodiments, system 100 can facilitate a user moving graphical element 212 within camera interface 204 based on a user input. For example, a user can use a drag or swipe gesture via touch screen 202 of mobile device 200 and move graphical element 212 to a more convenient location within camera interface 204. In some embodiments, user can move graphical element 212 at any location within camera interface 204. Alternatively, system 100 may include one or more locations within camera interface 204 to which graphical element 212 "snaps" in response to detecting a swipe gesture on graphical element 212.

In addition to detecting a user interaction to move graphical element 212, system 100 can further detect a selection of graphical element 212. For example, system 100 can detect a tap gesture or other user interaction with graphical element 212 via touchscreen 202 and perform one or more functions based on the user selection of graphical element 212. For example, in some embodiments, system 100 can open a content management application associated with graphical element 212 in response to detecting a user selection of graphical element 212. In particular, system 100 can provide a display of a graphical user interface associated with the content management application in response to detecting the user selection of graphical element 212. In one example, for instance, in response to detecting a user selection of graphical element 212, system 100 can facilitate providing a display of graphical user interface 304 described below in connection with FIGS. 3A-3D.

Figure 3D:
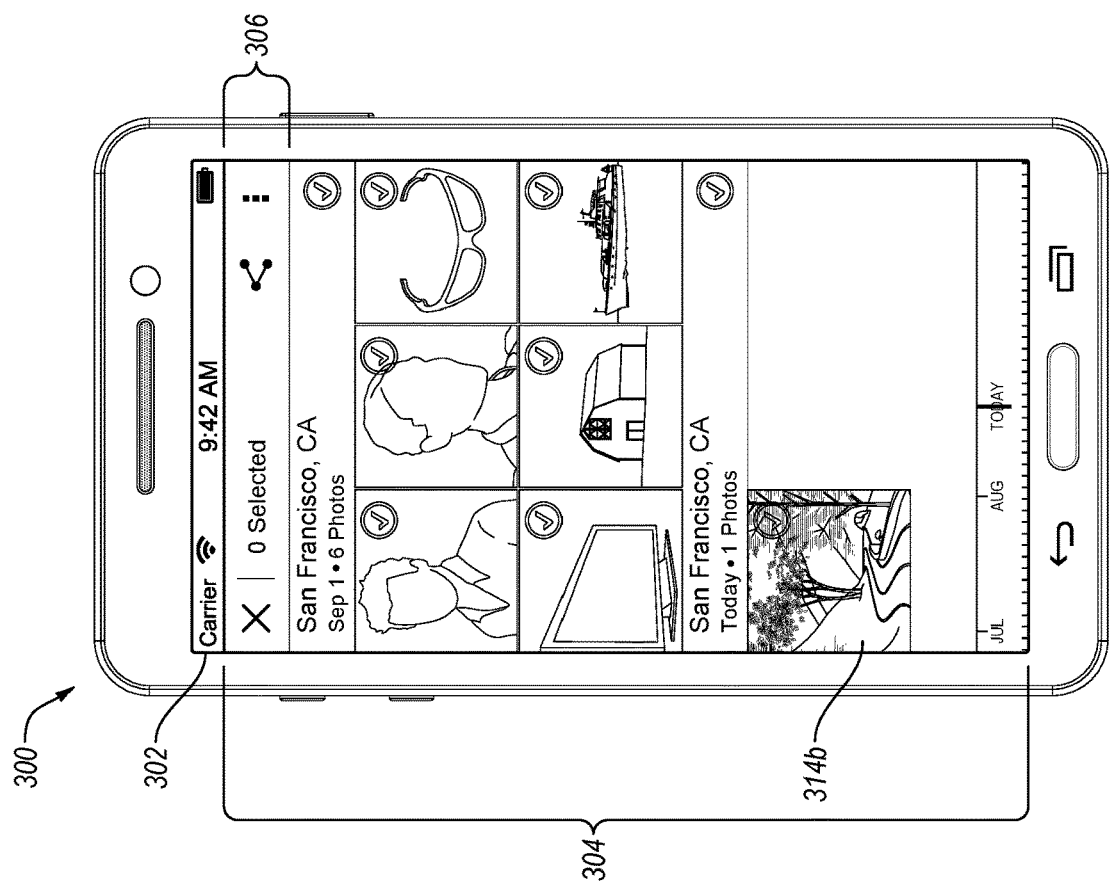

FIG. 3A illustrates an example mobile device 300 including touchscreen 302 and graphical user interface 304. In particular, FIG. 3A illustrates an example graphical user interface 304 associated with a content management application (or simply "gallery interface 304"). For example, as illustrated in FIG. 3A, system 100 can provide gallery interface 304 that includes a display of digital content and various controls within gallery interface 304 of mobile device 300. As shown in FIG. 3A, gallery interface 304 can include a presentation of a gallery of digital content. While FIG. 3A illustrates one embodiment of gallery interface 304 associated with a content management application, it is appreciated that one or more embodiments may include different types of applications having other functionalities with respect to digital content captured using a camera on mobile device 300. Further, while FIGS. 3A-3D relate to gallery interface 304 including a gallery of photos, it is appreciated that gallery interface 304 can relate to other types of digital content.

Additionally, as illustrated in FIG. 3A, gallery interface 304 can include a presentation of digital content in accordance with the content management application. For example, gallery interface 304 can include main header 306. Main header 306 can provide one or more objects or function symbols that enable a user to perform one or more functions with respect to the digital content. For example, as illustrated in FIG. 3A, main header 306 can include an object for deleting photos, sharing photos, and/or accessing a menu to perform one or more additional functions with respect to the photos displayed via the gallery interface. Additionally, in some embodiments, main header 306 can provide an indication of digital content that is selected. For example, as illustrated in FIG. 3A, main header 306 indicates that three photos are selected.

In addition to main header 306, gallery interface 304 associated with the content management application can include scroll element 308. As illustrated in FIG. 3A, scroll element 308 can allow a user to scroll through a gallery of digital content. Additionally, scroll element 308 can provide an indication of a date associated with currently displayed digital content within a gallery of digital content. For example, scroll element 308 can indicate a day, month, year, or other date information associated with digital content presented within gallery interface 304.

Additionally, gallery interface 304 associated with the content management application can include one or more groups 310a-b of digital content. For example, as illustrated in FIG. 3A, gallery interface 304 can provide a display of first group 310a and second group 310b of digital content. Additionally, as shown in FIG. 3A, each group 310a-b can include a group header 312 and one or more photos 314. Group header 312 can include information associated with photos 314. For example, group header 312 can include a location, date, and/or number of photos 314 within a group.

Additionally, each group header 312 and photo 314 can include an indication of a photo selection. In particular, group header 312 can include group selector 316 and each photo can include a respective photo selector 318. Group selector 316 and photo selector 318 can provide an indication of each group 310 and/or each photo 314 selected by a user and/or content management application. For example, a user can select one or more photos 314 individually by selecting photo selector 318 via touchscreen 302. Additionally, a user can select each photo 314 within group 310 of photos 314 by selecting group selector 316 via touchscreen 302. For example, a user can select one or more photos 314 or groups 310 of photos 314 by performing a touch gesture on group selector 316 and/or one or more photo selectors 318.

In addition to recognizing a user selection of one or more photos 314, content management application can select one or more photos 314 without receiving a user selection. For example, in some embodiments, system 100 can facilitate selection of one or more photos 314 in response to a camera application capturing the one or more photos 314. For example, selected photos 314 can correspond to each photo 314 recently captured using the camera application. As such, in some embodiments, the content management application can automatically select each photo 314 captured using the camera application.

For example, as illustrated in FIG. 3A, second group 310*b* of photos 314 can represent three photos taken recently using the camera application. For instance, as indicated in group header 312 corresponding to second group 310*b*, second group 310*b* can include three photos 314 taken using the camera application. Thus, upon detecting a user selection of graphical element 212 described above in connection with FIGS. 2B-2C, the content management application can provide a display within gallery interface 304 including an indication of an automatic selection of each of the recently captured photos 314. In this way, upon capturing one or more photos 314, a user can immediately navigate to the recently taken photos 314 within the content management application and view, share, delete, hide, edit, or perform one or more functions on the selected photos 314. In some embodiments, system 100 can facilitate automatic selection of each captured photo 314 in response to detecting that the camera application has captured photo 314. Alternatively, system 100 can facilitate selection of each captured photo 314 in response to detecting a user selection of graphical element 212 associated with the content management application.

Similar to FIG. 3A, FIG. 3B illustrates an example mobile device 300 including touchscreen 302 and preview interface 304 within a content management application. For instance, as illustrated in FIG. 3B, system 100 can provide preview interface 304 that provides a display of one or more selected photos 320. In some embodiments, selected photos 320 can correspond to each selected photo 314 from gallery interface 304 illustrated in FIG. 3A. For example, selected photos 320 can correspond to second group 310*b* of photos 314.

In some embodiments, system 100 can facilitate the presentation of preview interface 304 of FIG. 3B in response to detecting a touch gesture or other user interaction with respect to one or more photos 314 or groups 310*a-b* from gallery interface 304 illustrated in FIG. 3A. For example, upon selecting group selector 316, a user can perform a touch gesture to select one of the selected photos 314. In response to the touch gesture, system 100 can provide gallery interface 304 of FIG. 3B that includes a presentation of selected photos 320 corresponding to photos 314 selected using group selector 316 and/or photo selectors 318 from gallery interface 304. Alternatively, in some embodiments, system 100 can facilitate the presentation of preview interface 304 of FIG. 3B in response to detecting a user selection of graphical element 212 described above in connection with FIGS. 2A-2C.

Additionally, as shown in FIG. 3B, preview interface 304 can include enlarged photo 322. In particular, the preview interface can provide enlarged photo 322 corresponding to one of selected photos 320. In some embodiments, enlarged photo 322 can correspond to whichever selected photo 320 is highlighted and/or selected by a user. For example, a user can highlight one of selected photos 320 by interacting with one of selected photos 320 using a touch gesture on touchscreen 302. Additionally, a user can change the display of enlarged photo 322 by scrolling through one or more selected photos 320 using a swiping gesture or other user interaction.

In some embodiments, a user can select or deselect photos within preview interface 304. In some embodiments, a user can select photos within preview interface 304 by performing a user interaction with enlarged photo 322 or one of selected photos 320. For example, in some embodiments, a user can select, save, or otherwise highlight a photo by swiping enlarged photo 322 or one or selected photos 320 in an upward direction on preview interface 304. Additionally, a user can deselect, hide, or delete a photo by swiping enlarged photo 322 or one of selected photos 320 in a downward direction on preview interface 304.

Alternatively, other touch gestures may indicate a user selection, deselection, or other action with respect to enlarged photo 322 or one of selected photos 320. For example, rather than performing a swipe or drag function, a user can select or deselect a photo by using a touch, tap, double-tap, or other gesture with enlarged photo 322 or one of selected photos 320. It is noted that selecting and/or deselecting a photo may provide a similar functionality as selecting and/or deselecting photos 314 in gallery interface 304 described above in connection with FIG. 3A. (e.g., by selecting group selector 316 and/or photo selector 318).

Additionally, as illustrated in FIG. 3B, preview interface 304 can include a header including one or more objects or function symbols. For example, preview interface 304 can include deselect icon 324. In some embodiments, a user can hide a display of selected photos 320 by interacting with deselect icon 324. Alternatively, a user can deselect a highlighted or featured photo from selected photos 320 by interacting (e.g., via a touch gesture) with deselect icon 324.

In addition to deselect icon 324, header of gallery interface 304 can include share icon 326 for sharing or providing access to one or more additional users or devices to one or more selected photos 320. While FIG. 3B illustrates deselect icon 324 and share icon 326, other embodiments may include other objects or function symbols associated with functionality of the content management application.

As described above, content management application can automatically select one or more photos captured using the camera application. Further, as described above, system 100 can facilitate providing a first view of gallery interface 304 in response to a selection of graphical element 212 associated with the content management system. In some embodiments, rather than providing the first view of gallery interface 304 illustrated in FIG. 3A, system 100 can facilitate a presentation of the preview view of preview interface 304 illustrated in FIG. 3B and include each recently captured photo in selected photos 320. In this way, upon capturing one or more photos 314, a user can immediately view enlarged photo 322 and one or more recently captured photos 320, and thereby directly save or share the best of selected photos 320. Alternatively, the user can immediately navigate to selected photos 320 and discard or delete duplicative or the low quality selected photos 320.

In one example of providing preview interface 304 of FIG. 3B, system 100 may detect a user selection of graphical element 212 described above in connection with FIGS. 2A-2C. In response to detecting the user selection, system 100 can facilitate a presentation of preview interface 304 of FIG. 3B. In particular, system 100 can provide a presentation of gallery interface 304 including automatically selected photos 320 based on photos recently captured using the camera application. A user may quickly scan the recently captured photos and save or discard the photos by interacting with enlarged photo 322 or selected photos 320. For example, a user my save a photo by swiping upward on enlarged photo 322. Conversely, a user may delete or hide a photo by swiping downward on enlarged photo 322. As such, a user may conveniently interact with one or more recently captured photos within preview interface 304 in response to selecting graphical element 212 within graphical user interface 204 described above.

Figure 3C:
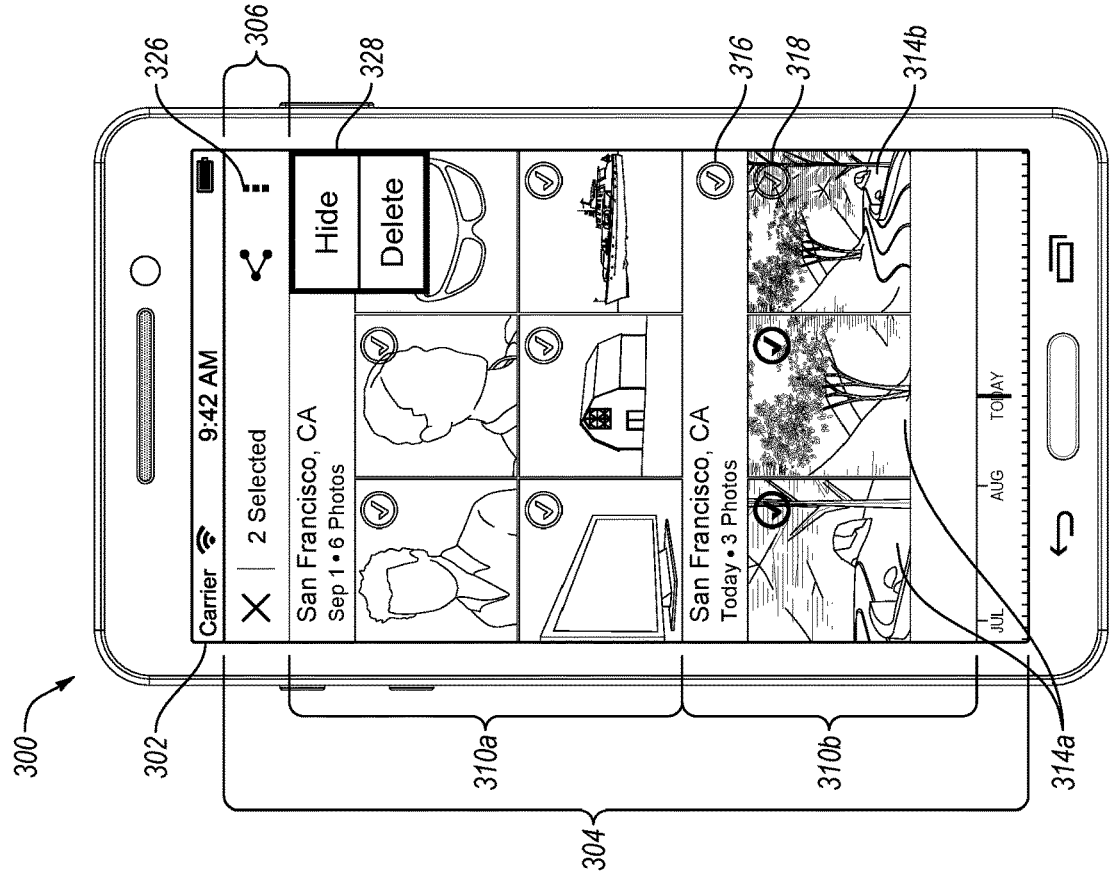

Similar to FIG. 3A, FIG. 3C illustrates an example mobile device 300 including touchscreen 302 and gallery interface 304. In particular, FIG. 3C illustrates gallery interface 304 associated with the content management application similar to gallery interface 304 described above in connection with FIG. 3A. It is noted that gallery interface 304 illustrated in FIG. 3C can have similar features and functionality as gallery interface 304 illustrated in FIG. 3A.

Additionally, as illustrated in FIG. 3C, gallery interface 304 can provide an indication that one or more photos 314 are selected. For example, FIG. 3C shows two selected photos 314a of second group 310b and a third non-selected photo 314b. As shown, gallery interface 304 can provide an indication of selection or by highlighting or otherwise emphasizing photo selector 318 associated with each of photos 314a that are selected. Additionally, as shown in main header 306, gallery interface 304 can provide an indication of selected photos 314a and/or non-selected photos 314b, including an indication of each photo that is selected or non-selected.

In addition to selecting or deselecting photos 314, system 100 can facilitate performing one or more functions with respect to selected photos 314a. In particular, main header 306 can include one or objects or function symbols that enable a user to perform functions with respect to selected photos 314a. In some embodiments, for example, a user can select menu icon 326 using a touch gesture or other interaction with touchscreen 302. In response to detecting the touch gesture, the content management application can provide drop down menu 328 of one or more functions to perform with respect to selected photos 314a. For example, drop down menu 328 can include hide or delete functions. In response to detecting a touch gesture on the hide or delete functions, system 100 can remove each of selected photos 314a from gallery interface 304 or delete selected photos 314a from mobile device 300.

Similar to FIGS. 3A and 3C, FIG. 3D illustrates an example mobile device 300 including touchscreen 302 and gallery interface 304. In particular, FIG. 3D illustrates gallery interface 304 of FIG. 3C after hiding or deleting selected photos 314 from gallery interface 304. For example, upon detecting a user selection of the hide or delete option from drop down menu 328, the content management application can provide gallery interface 304 without selected photos 314a from gallery interface 304 described in FIG. 3C. As such, upon detecting a user selection to hide or delete selected photos 314a, gallery interface 304 can include a presentation of remaining photo 314b that was not selected. Additionally, as shown in FIG. 3D, main header 306 can indicate that no photos are selected.

Figure 4:
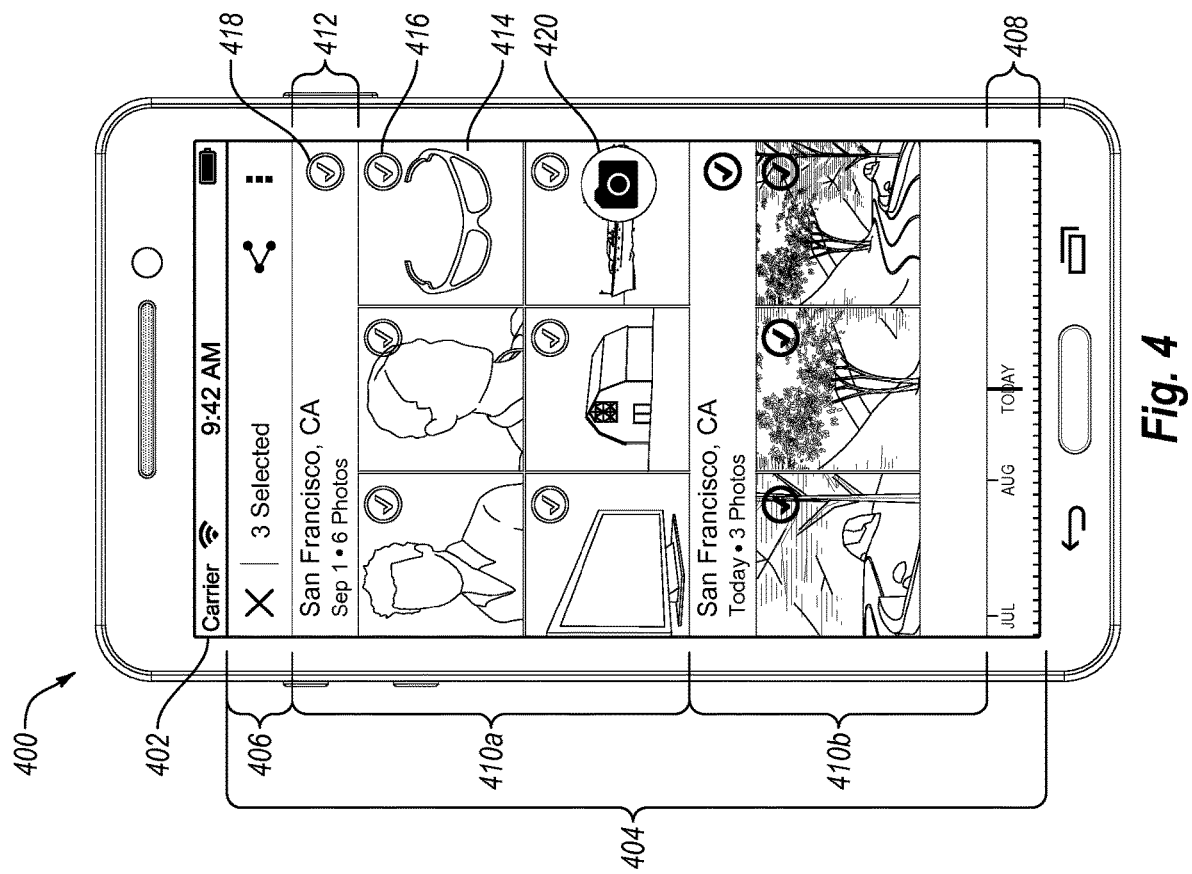
FIG. 4 illustrates another example of a user interface for managing digital content in accordance with one or more principles described herein.

FIG. 4 illustrates an example mobile device 400 including touchscreen 402 and graphical user interface 404. In particular, FIG. 4 illustrates an example graphical user interface 404 associated with a content management application (or simply "gallery interface 404") in accordance with one or more embodiments described herein. For example, system 100 can provide gallery interface 404 that includes a presentation of digital content. As illustrated in FIG. 4, gallery interface 404 can include main header 406, scroll element 408, groups 410a-b of digital content including group header 412, photos 414, photo selectors 416, and group selectors 418. Each of mobile device 400, touchscreen 402, gallery interface 404, main header 406, scroll element 408, groups 410a-b, group headers 412, photos 414, photo selectors 416, and group selectors 418 can have similar features and functionality as similar elements described above in connection with FIGS. 3A-3D.

Additionally, gallery interface 404 may further include graphical element 420 associated with the camera application. In some embodiments, graphical element 420 associated with the camera application can have a similar size, shape, and location within gallery interface 404 as graphical element 212 associated with the content management application as described above. In some embodiments, graphical element 420 can include a camera icon or symbol to indicate to a user that graphical element 420 is associated with the camera application.

Similar to features and functionality of graphical element 212 associated with the content management application, graphical element 420 associated with the camera application can facilitate a switch between the content management application and the camera application. In particular, in response to detecting a user interaction with graphical element 420, system 100 can switch gallery interface 404 with a display of a camera interface. For example, in response to a user selection of graphical element, system 100 can cause the camera application to operate in the foreground of an operating system operating on mobile device 400 while moving operation of the content management application to the background of the operating system operating on mobile device 400.

Figure 5:
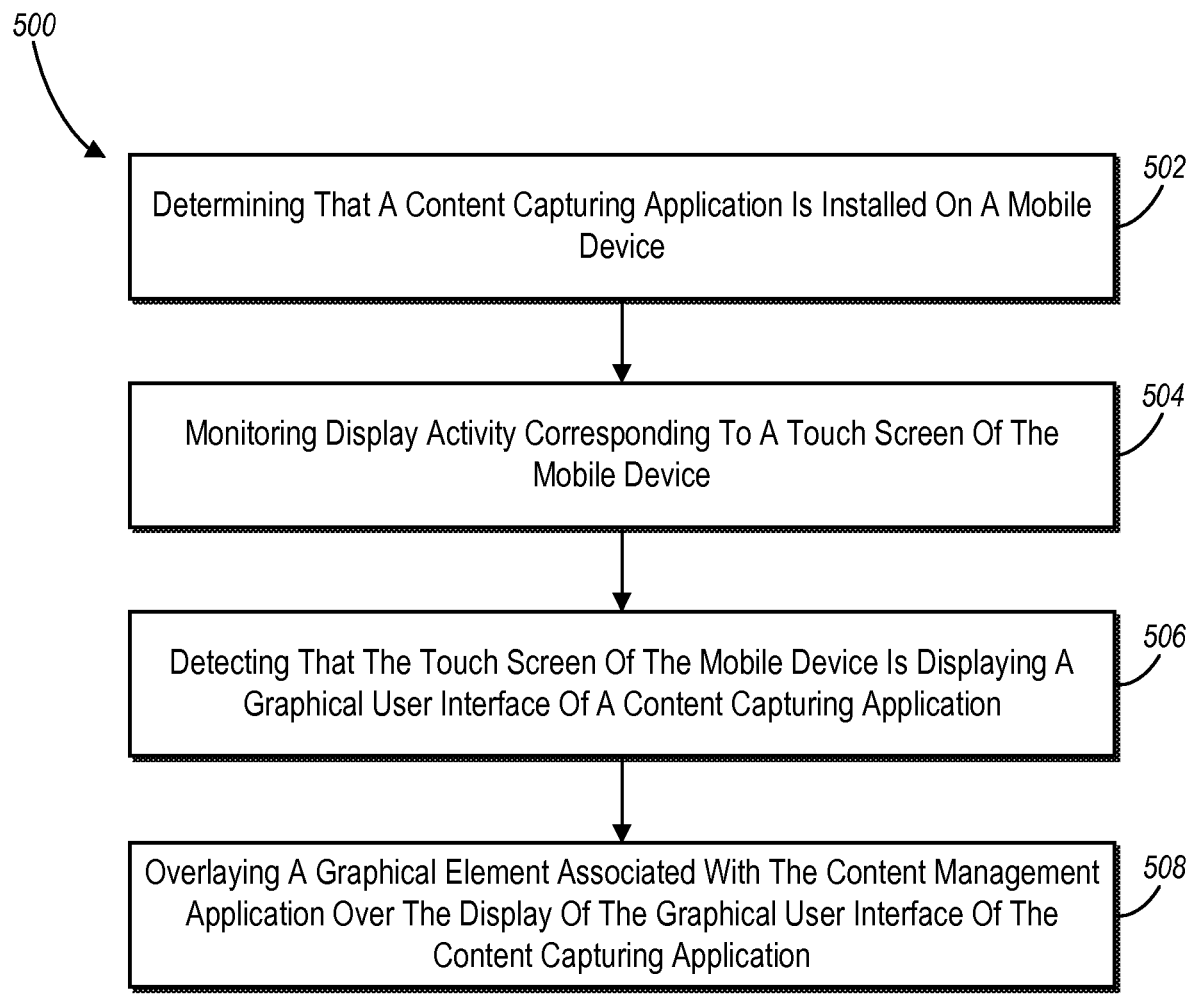
FIG. 5 illustrates a flow diagram illustrating a method of navigating digital content in accordance with principles described herein.

FIG. 5 illustrates a flowchart of an example method 500 of navigating digital content in accordance with principles described herein. While FIG. 5 illustrates example steps according to one embodiment, other embodiments may omit, add to, reorder, and/or modify any of the steps shown in FIG. 5. One or more steps shown in FIG. 5 may be performed by any of the components illustrated in system 100 illustrated in FIG. 1. Further, one or more steps of method 500 can be performed using a mobile device or online content management system, or a combination of both.

For example, method 500 includes step 502, which may include determining that a content capturing application is installed on a mobile device. In particular, step 502 can include determining, using at least one processor, that a content capturing application is installed on a mobile device. The content capturing application can include a digital camera application or other application having access to functionality of a camera on the mobile device.

In addition, method 500 includes step 504, which may include monitoring display activity corresponding to a touch screen of the mobile device. For instance, step 504 can include monitoring, using the at least one processor, display activity corresponding to a touch screen of the mobile device. For example, monitoring display activity can include monitoring the foreground activity of a mobile device to determine that a particular application is currently active on displayed on a display device of the mobile device.

In addition, method 500 includes step 506, which may include detecting that the touch screen of the mobile device is displaying a graphical user interface of a content capturing application. In particular, step 506 can include detecting, based on the monitored display activity, that the touch screen of the mobile device is displaying a graphical user interface of the content capturing application. For example, step 506 can include detecting a camera view is presented on the display device of the mobile device.

In addition, method 500 includes step 508, which may include overlaying a graphical element associated with a content management application (e.g., a video and photo management application) over the display of the graphical user interface of the content capturing application. In particular, step 508 can include in response to detecting that the touch screen is displaying the graphical user interface of the content capturing application, overlaying a graphical element associated with a content management application over the display of the graphical user interface of the content capturing application. Overlaying the graphical element may be in response detecting that the touch screen is displaying the graphical user interface of the content capturing application. Additionally, the graphical element can overlay only a portion of the graphical user interface of the content capturing application.

Additionally, method 500 may include identifying one or more characteristics of the graphical user interface of the content capturing application. Method 500 may further include determining, based on the one or more characteristics, a location void of user interaction elements within the graphical user interface of the content capturing application. Method 500 may further include positioning the overlay of the graphical element at the location void of interaction elements.

In addition, method 500 can include detecting (e.g., via the touch screen) a user interaction with respect to the graphical element associated with the content management application. Method 500 can further include changing from the touchscreen displaying the graphical user interface of the content capturing application to the touchscreen displaying a graphical user interface of the content management application. Changing from the content capturing application to the content management application may be in response to detecting the user interaction with respect to the graphical element.

In addition, method 500 can include detecting that or more digital content items have been captured using the content capturing application while simultaneously displaying the overlay of the graphical element associated with the content management application. Method 500 can also include detecting a user interaction with the graphical element and, in response to the user interaction, presenting a graphical user interface of the content management application. Further, method 500 can include selecting (e.g., without further user interaction) each of the one or more captured digital content items. Method 500 can further include providing a display of the selected one or more digital content items within the graphical user interface of the content management application. Method 500 can also include enabling a user to delete or save at least one of the selected digital content items.

In some embodiments, the content capturing application can include a digital camera application having access to camera functionality on the mobile device. Additionally, in some embodiments, method 500 can include determining that the camera functionality has been used by the content capturing application and overlaying the graphical element based on determining that the camera functionality has been used by the content capturing application.

Additionally, in some embodiments, overlaying the graphical element can include considering one or more characteristics of an application or mobile device. For example, method 500 can include determining one or more characteristics of a graphical user interface associated with a content capturing application and positioning the graphical element within the graphical user interface based on the one or more characteristics of the graphical user interface. Additionally or alternatively, method 500 can include determining one or more characteristics of the touch screen of the mobile device and positioning the graphical element within the graphical user interface displayed on the touchscreen based on the one or more characteristics of the touch screen. In some embodiments, method 500 can include modifying a location of the graphical element within the graphical user interface in response to detecting a user interaction (e.g., swipe or drag gesture) with the graphical element.

Figure 6:
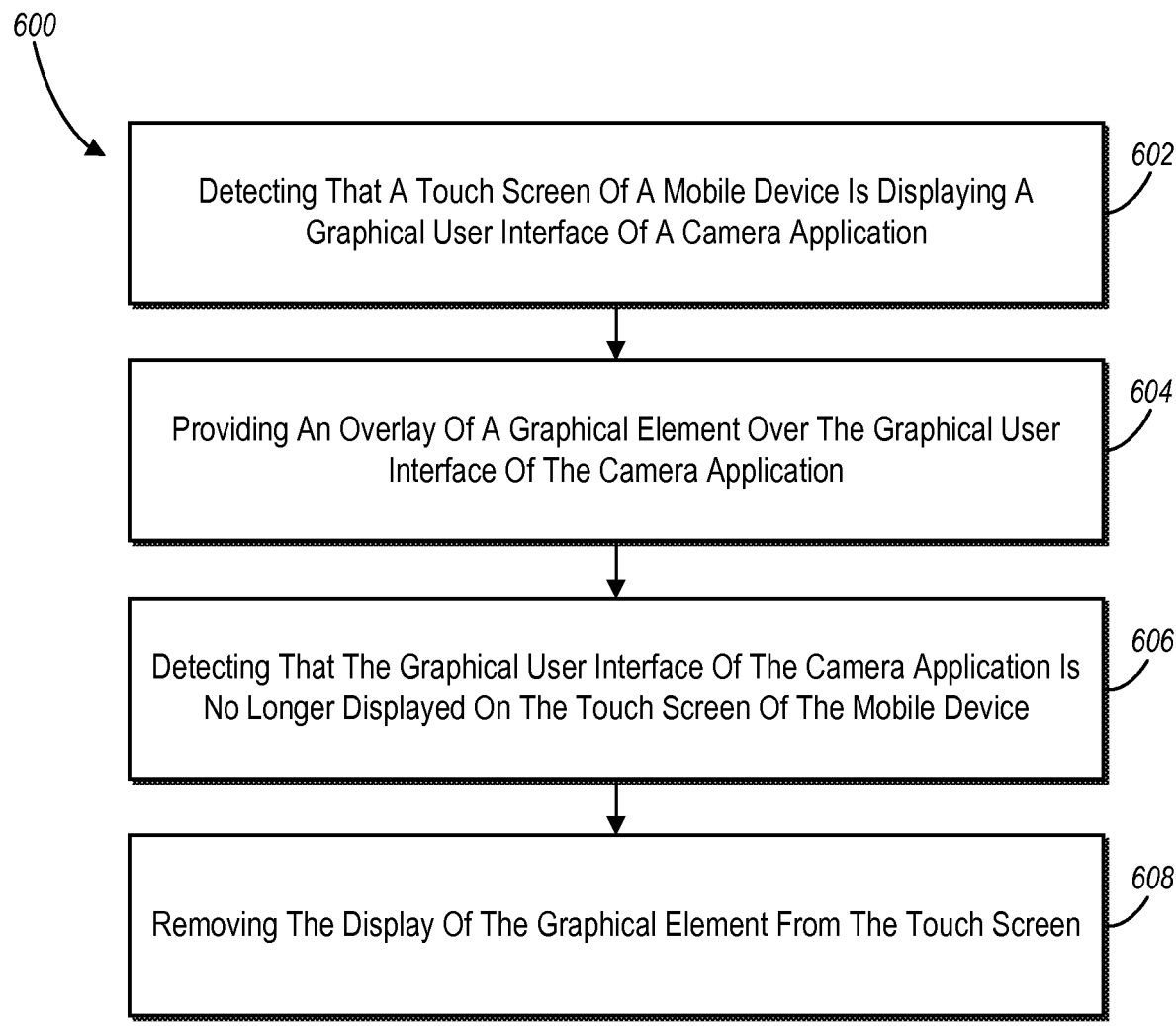
FIG. 6 illustrates a flow diagram illustrating a method of navigating digital content in accordance with principles described herein.

FIG. 6 illustrates a flowchart of an example method 600 of navigating digital content in accordance with principles described herein. While FIG. 6 illustrates example steps according to one embodiment, other embodiments may omit, add to, reorder, and/or modify any of the steps shown in FIG. 6. One or more steps shown in FIG. 6 may be performed by any of the components illustrated in system 100 illustrated in FIG. 1. Further, one or more steps of method 600 can be performed using a mobile device or online content management system, or a combination of both.

For example, method 600 includes step 602, which may include detecting that a touch screen of a mobile device is displaying a graphical user interface of a camera application. In particular, step 602 can include detecting, using one or more processors, that a touch screen of a mobile device is displaying a graphical user interface of a camera application. For example, the system 100 can determine a camera view is currently displayed on the touchscreen of the mobile device.

Additionally, method 600 includes step 604, which may include providing an overlay of a graphical element over the graphical user interface of the camera application. In particular, step 604 can include based on detecting the display of the graphical user interface of the camera application, providing an overlay of a graphical element over the graphical user interface of the camera application, wherein the graphical element is associated with a content management application. Providing the overlay may be based on detecting the display of the graphical user interface associated with the camera application. Additionally, the graphical element may be associated with a content management application.

Method 600 further includes step 606, which may include detecting that the graphical user interface of the camera application is no longer displayed on the touch screen of the mobile device. In particular, step 606 can include detecting, using the one or more processors, that the graphical user interface of the camera application is no longer displayed on the touch screen of the mobile device. For example, system 100 can detect a content management application is displayed on the touch screen of the mobile device. Alternatively, the system 100 can detect that the camera application is no longer operating in the foreground. In addition, method 600 includes step 608, which may include removing the display of the graphical element from the touch screen.

Additionally, while not shown in FIG. 6, method 600 can further include detecting that one or more digital content items have been captured using the camera application while simultaneously displaying the overlay of the graphical element. Further, in response to detecting a user selection with respect to the graphical element, method 600 can include providing a display of a gallery interface associated with the content management application. Method 600 can also include preselecting each of the one or more captured digital content items within the gallery interface. Further, in response to detecting a user interaction with respect to one of the preselected digital content items, method 600 can include providing a preview of the preselected digital content items within a preview interface associated with the content management application. In response to detecting a predefined user interaction (e.g., a touch gesture) with the preview interface, method 600 can include enabling a user to delete or save at least one of the preselected digital content items.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general purpose computer to turn the general purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 7:
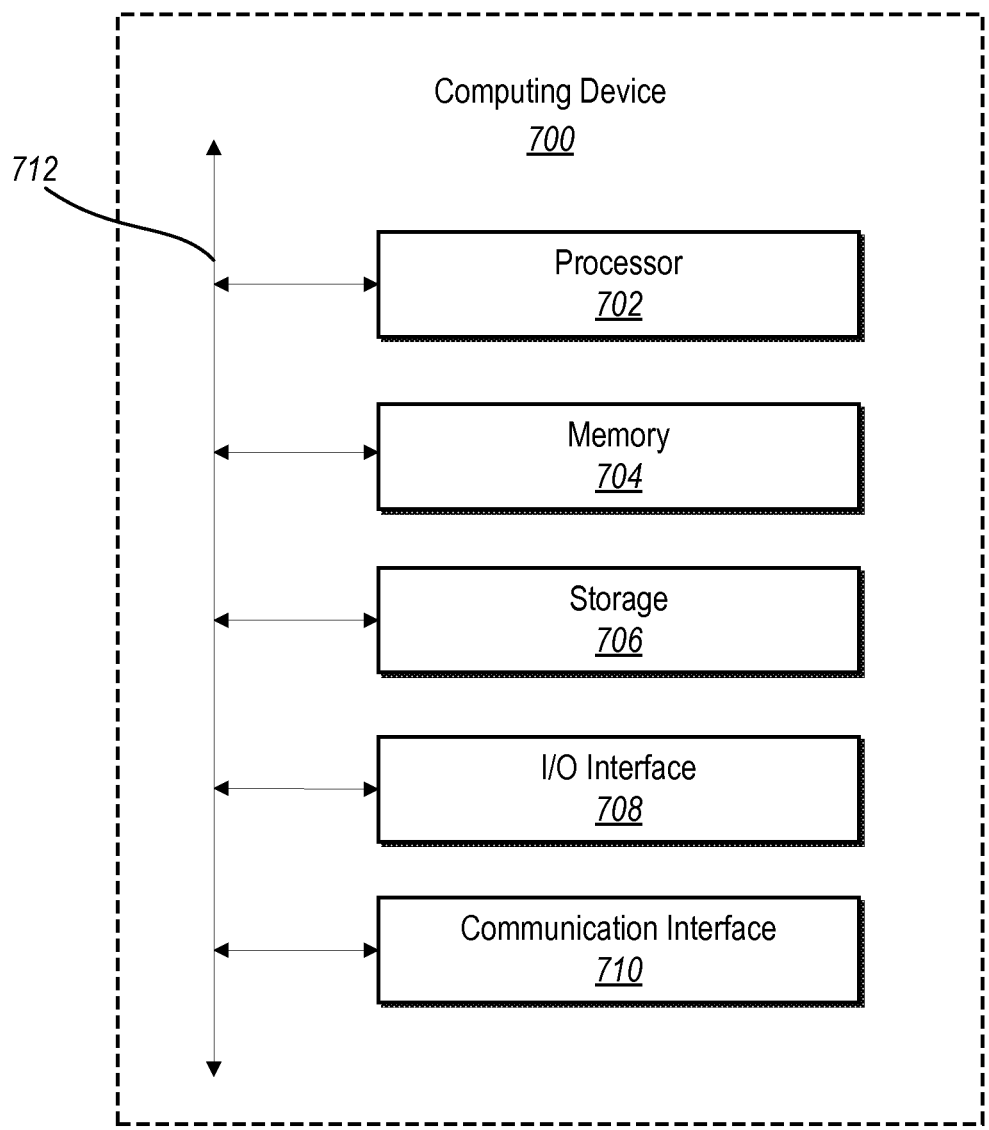
FIG. 7 illustrates a block diagram of an exemplary computing device in accordance with principles described herein.

FIG. 7 illustrates a block diagram of exemplary computing device 700 that may be configured to perform one or more of the processes described above. One will appreciate that content navigation system 100, mobile device 200, 300, 400, and online content management system each may be implemented by one or more computing devices such as computing device 700. As shown by FIG. 7, computing device 700 can comprise processor 702, memory 704, storage device 706, I/O interface 708, and communication interface 710, which may be communicatively coupled by way of communication infrastructure 712. While an exemplary computing device 700 is shown in FIG. 7, the components illustrated in FIG. 7 are not intended to be limiting. Additional or alternative components may be used in other embodiments. Furthermore, in certain embodiments, computing device 700 can include fewer components than those shown in FIG. 7. Components of computing device 700 shown in FIG. 7 will now be described in additional detail.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage device 706 and decode and execute them. In particular embodiments, processor 702 may include one or more internal caches for data, instructions, or addresses. As an example and not by way of limitation, processor 702 may include one or more instruction caches, one or more data caches, and one or more translation lookaside buffers (TLBs). Instructions in the instruction caches may be copies of instructions in memory 704 or storage 706.

Memory 704 may be used for storing data, metadata, and programs for execution by the processor(s). Memory 704 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 704 may be internal or distributed memory.

Storage device 706 includes storage for storing data or instructions. As an example and not by way of limitation, storage device 706 can comprise a non-transitory storage medium described above. Storage device 706 may include a hard disk drive (HDD), a floppy disk drive, flash memory, an optical disc, a magneto-optical disc, magnetic tape, or a Universal Serial Bus (USB) drive or a combination of two or more of these. Storage device 706 may include removable or non-removable (or fixed) media, where appropriate. Storage device 706 may be internal or external to computing device 700. In particular embodiments, storage device 706 is non-volatile, solid-state memory. In other embodiments, Storage device 706 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 708 allows a user to provide input to, receive output from, and otherwise transfer data to and receive data from computing device 700. I/O interface 708 may include a mouse, a keypad or a keyboard, a touch screen, a camera, an optical scanner, network interface, modem, other known I/O devices or a combination of such I/O interfaces. I/O interface 708 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interface 708 is configured to provide graphical data to a display for presentation to a user. The graphical data may be representative of one or more graphical user interfaces and/or any other graphical content as may serve a particular implementation.

Communication interface 710 can include hardware, software, or both. In any event, communication interface 710 can provide one or more interfaces for communication (such as, for example, packet-based communication) between computing device 700 and one or more other computing devices or networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 710 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 710 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 710 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 712 may include hardware, software, or both that couples components of computing device 700 to each other. As an example and not by way of limitation, communication infrastructure 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 8:
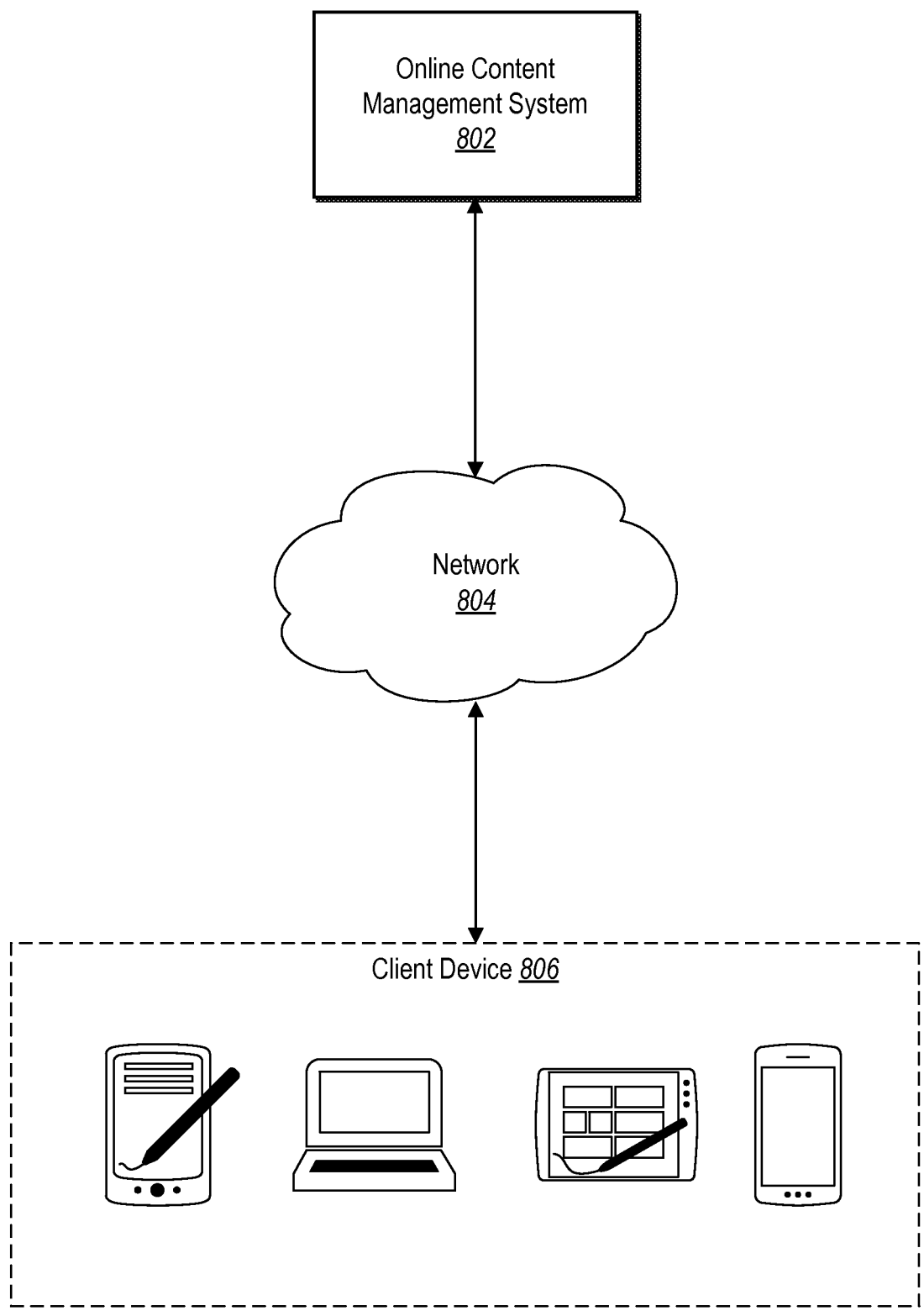
FIG. 8 illustrates a networking environment of an online content management system according to one or more embodiments.

FIG. 8 is a schematic diagram illustrating an online content management system 802 that can implement one or more features of the present disclosure. Online content management system 802 may generate, store, manage, receive, and send digital content items. For example, online content management system 802 may send and receive content items to and from client devices 806 by way of network 804. In particular, online content management system 802 can store and manage a collection of content items. Online content management system 802 can manage the sharing of content items between computing devices associated with a plurality of users. For instance, online content management system 802 can facilitate a user sharing a content item with another user of the online content management system.

In particular, online content management system 802 can manage synchronizing content items across multiple client devices 806 associated with one or more users. For example, user may edit a content item using client devices 806. The online content management system 802 can cause client device 806 to send the edited content item to online content management system 802. Online content management system 802 then synchronizes the edited content item on one or more additional computing devices.

In addition to synchronizing content items across multiple devices, one or more embodiments of the online content management system can provide an efficient storage option for users that have large collections (e.g., galleries) of content items. For example, the online content management system 802 can store a collection of content items, while the client device 806 only stores reduced-sized versions of the content items. A user can navigate and browse the reduced-sized versions (e.g., thumbnail images of photos) of the content items on client device 806. In particular, one way in which a user can experience content items is to browse the reduced-sized versions of the content items on client device 806. Online content management system 802 may store any number of reduced size versions (e.g., thumbnails) of digital content items and provide them to client device 806 at a suitable time (e.g., to allow client device 806 to emphasize one or more digital content items within a graphical user interface).

Client device 806 may be a desktop computer, a laptop computer, a tablet computer, a personal digital assistant (PDA), an in- or out-of-car navigation system, a handheld device, a smart phone or other cellular or mobile phone, or a mobile gaming device, other mobile device, or other suitable computing devices. Client device 806 may execute one or more client applications, such as a web browser (e.g., Microsoft Windows Internet Explorer, Mozilla Firefox, Apple Safari, Google Chrome, Opera, etc.) or a native or special-purpose client application (e.g., Facebook for iPhone or iPad, Facebook for Android, etc.), to access and view content over network 804.

Network 804 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 806 may access online content management system 802.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A method comprising:
   determining, by at least one processor, that a content capturing application and a separate content management application are installed on a mobile device;
   monitoring, by the at least one processor, display activity corresponding to a touch screen of the mobile device;
   detecting, based on the display activity, that the touch screen of the mobile device is displaying a graphical user interface of the content capturing application; and
   in response to detecting that the touch screen is displaying the graphical user interface of the content capturing application, overlaying a graphical element associated with the content management application over the display of the graphical user interface of the content capturing application.

2. The method of claim 1, wherein:
   the content capturing application is a digital camera application; and
   the content management application is a video and photo management application.

3. The method of claim 1, wherein the graphical element associated with the content management application is overlaid on only a portion of the graphical user interface of the content capturing application.

4. The method of claim 1, further comprising:
   identifying one or more characteristics of the graphical user interface of the content capturing application; and
   determining, based on the one or more characteristics, a location void of user interaction elements within the graphical user interface of the content capturing application.

5. The method of claim 4, further comprising positioning the graphical element associated with the content management application at the location void of user interaction elements.

6. The method of claim 1, further comprising detecting, via the touch screen, a user interaction with respect to the graphical element associated with the content management application.

7. The method of claim 6, further comprising changing, in response to detecting the user interaction with respect to the graphical element, from the touch screen displaying the graphical user interface of the content capturing application to the touch screen displaying a graphical user interface of the content management application.

8. The method of claim 1, further comprising detecting, by the at least one processor, that one or more digital content items have been captured using the content capturing application while simultaneously displaying the graphical element associated with the content management application.

9. The method of claim 8, further comprising:
   detecting a user interaction with the graphical element associated with the content management application after detecting that one or more digital content items have been captured using the content capturing application;

in response to the user interaction, presenting a graphical user interface of the content management application; and selecting, without further user interaction, each of the one or more captured digital content items.

10. The method of claim 9, further comprising:

providing a display of the selected one or more digital content items within the graphical user interface of the content management application; and enabling a user to delete or save at least one of the selected digital content items.

11. A non-transitory computer readable medium comprising instructions that, when executed by at least one processor, cause a computer device to:

determine that a content capturing application and a separate content management application are installed on a mobile device;

monitor display activity corresponding to a touch screen of the mobile device;

detect, based on the display activity, that the touch screen of the mobile device is displaying a graphical user interface of the content capturing application; and in response to detecting that the touch screen is displaying the graphical user interface of the content capturing application, overlay a graphical element associated with the content management application over the display of the graphical user interface of the content capturing application.

12. The non-transitory computer readable medium of claim 11, wherein:

the content capturing application is a digital camera application; and the content management application is a video and photo management application.

13. The non-transitory computer readable medium of claim 11, wherein the graphical element associated with the content management application is overlaid on only a portion of the graphical user interface of the content capturing application.

14. The non-transitory computer readable medium of claim 11, further comprising instructions that, when executed by the at least one processor, cause the computer device to:

identify one or more characteristics of the graphical user interface of the content capturing application; and determine, based on the one or more characteristics, a location void of user interaction elements within the graphical user interface of the content capturing application.

15. The non-transitory computer readable medium of claim 14, further comprising instructions that, when executed by the at least one processor, cause the computer device to position the graphical element associated with the content management application at the location void of user interaction elements.

16. A mobile device comprising:

at least one processor; and a non-transitory computer readable medium comprising instructions that, when executed by the at least one processor, cause the mobile device to:

determine that a content capturing application and a separate content management application are installed on a mobile device;

monitor display activity corresponding to a touch screen of the mobile device;

detect, based on the display activity, that the touch screen of the mobile device is displaying a graphical user interface of the content capturing application; and in response to detecting that the touch screen is displaying the graphical user interface of the content capturing application, overlay a graphical element associated with the content management application over the display of the graphical user interface of the content capturing application.

17. The mobile device of claim 16, wherein:

the content capturing application is a digital camera application; and the content management application is a video and photo management application.

18. The mobile device of claim 16, wherein the graphical element associated with the content management application is overlaid on only a portion of the graphical user interface of the content capturing application.

19. The mobile device of claim 16, further comprising instructions that, when executed by the at least one processor, cause the mobile device to:

identify one or more characteristics of the graphical user interface of the content capturing application; and determine, based on the one or more characteristics, a location void of user interaction elements within the graphical user interface of the content capturing application.

20. The mobile device of claim 19, further comprising instructions that, when executed by the at least one processor, cause the mobile device to position the graphical element associated with the content management application at the location void of user interaction elements.

* * * * *